UNITED STATES PATENT OFFICE.

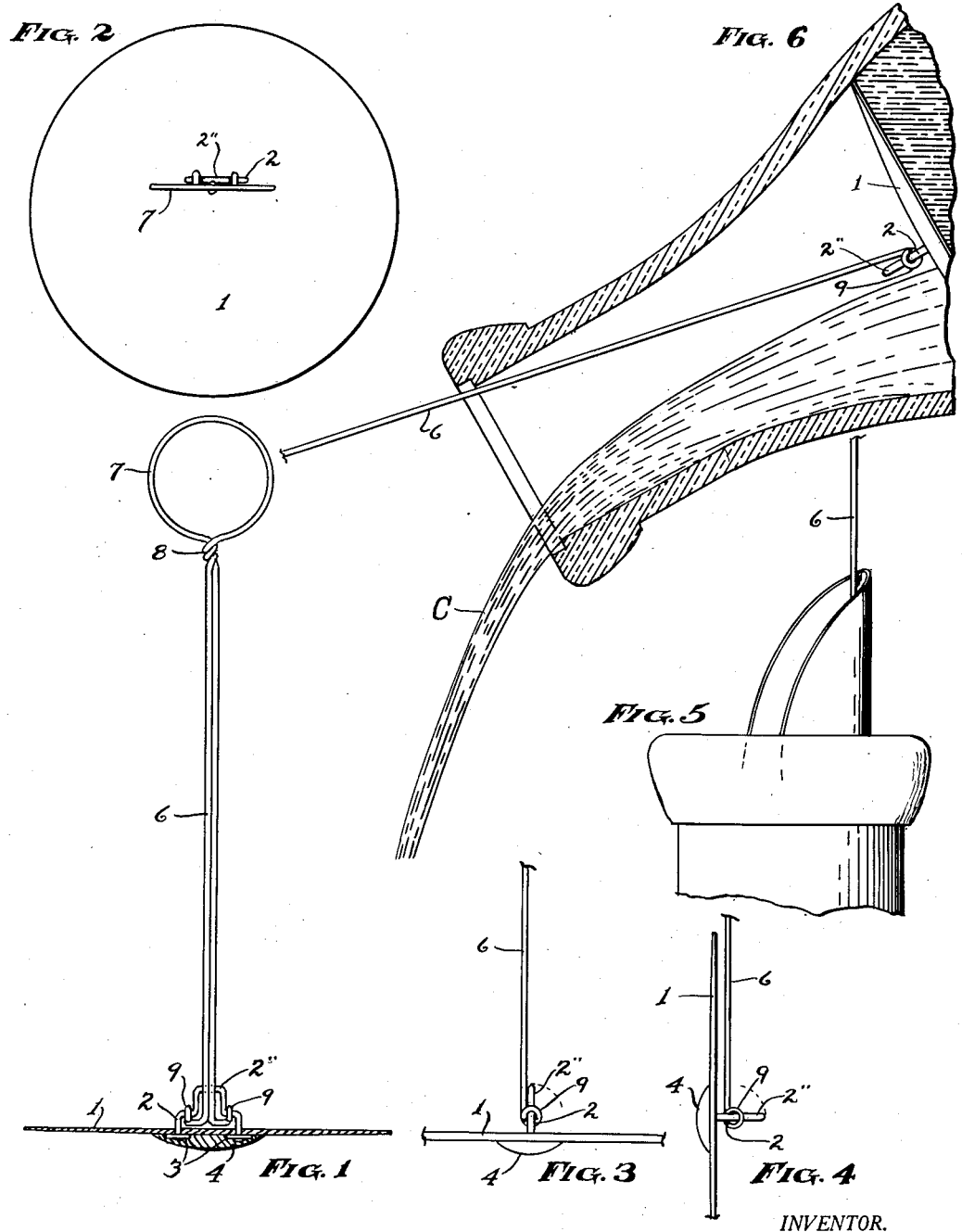

CHARLES E. CHAMBERS, OF ELDORADO, KANSAS.

SKIMMER.

1,405,668.  Specification of Letters Patent.  Patented Feb. 7, 1922.

Application filed February 10, 1921. Serial No. 444,028.

*To all whom it may concern:*

Be it known that I, CHARLES E. CHAMBERS, a citizen of the United States, and a resident of Eldorado, in the county of Butler and State of Kansas, have invented certain new and useful Improvements in Skimmers, of which the following is a specification.

This invention relates to a utensil for skimming liquids from heavier liquids contained in small jars or bottles, and has its most common application as a skimmer of bottled milk.

Ordinarily it is impossible for the purchaser of bottled milk to remove the risen cream from the bottle without mixing some of the milk with the cream. By the use of my device, all the cream may quickly be removed from a bottle without removing any of the milk. Reference is had to the accompanying drawings, in which:

Fig. 1 is a sectional elevation of my improved skimmer; Fig. 2 is a top plan view of same; Fig. 3 and Fig. 4 are detail views of same; Fig. 5 shows the folding of the disc for insertion into a bottle; and Fig. 6 illustrates the position in which the device is held in a milk bottle during removal of the cream.

1 denotes a thin, normally flat, circular disc of soft rubber. The diameter of the disc is determined by two factors—the internal size of the bottle or jar, and the internal diameter of the neck of the container at the cream line. Where the cream line is high enough to fall within the neck, the disc may be made of the cream-line diameter; but where there is as a rule enough cream in each bottle to extend down to the full bore of the bottle, the disc should be cut to a corresponding size.

2 denotes a wire loop having its ends passed through the disc at one side of center, and provided with heads 3 which are held in contact with the disc by a rubber button 4, cemented to the disc over said heads. The loop 2 is bent to form a pair of shoulders 2' which form a turning axis for the disc. The central portion 2" of the loop forms a stop.

The shank 6 is made by forming an eye 7 in the center of a length of wire, twisting the wire as at 8, forming the straight shank 6, bending the ends oppositely, and forming on said ends a pair of eyes 9, which are formed about the wire shoulders 2', thereby completing the means whereby the disc is pivoted upon the shank. When the disc is normal to the shank (Fig. 1) the latter will be in contact with the stop 2". Thus, the disc can be turned to one side but not to the other—for example, it can be turned to the position shown by Fig. 4.

To insert the skimmer into a bottle or jar having a neck aperture less than the diameter of the disc, the disc is turned to the Fig. 4 position and is doubled about the shank as shown by Fig. 5 and inserted. The shank or handle is then slowly depressed until the disc passes just below the lighter liquid. If below the neck the disc will flatten out and contact the wall of the bottle, so sealing in the heavier liquid. If the skimming line be above the full diameter, a little manipulation will enable the user to draw off the lighter liquid without mixing. Tilting the disc from the perpendicular facilitates the last named operation. The lighter liquid may be poured out as shown at "C" on Fig. 6.

Having described my invention, I claim, and desire to secure by Letters Patent:

A skimmer comprising a flexible, normally flat disc, a wire loop secured to an eccentric portion of the disc, said loop comprising a pair of shoulders and a stop; and a wire shank comprising a doubled wire having its ends bent to form a pair of eyes, said eyes being pivotally mounted on the respective shoulders of said loop.

CHARLES E. CHAMBERS.

Witnesses:
L. C. PIRTLE,
CLYDE KING.